United States Patent [19]

Sumi

[11] 4,386,829
[45] Jun. 7, 1983

[54] MECHANICAL MOUNTING SYSTEM FOR A ZOOM LENS ASSEMBLY

[75] Inventor: Akiyasu Sumi, Kawasaki, Japan

[73] Assignee: Canon Kabushiki Kaisha, Tokyo, Japan

[21] Appl. No.: 166,825

[22] Filed: Jul. 8, 1980

[30] Foreign Application Priority Data

Jul. 13, 1979 [JP] Japan .................................. 54-89118
Jul. 20, 1979 [JP] Japan .................................. 54-92308
Aug. 31, 1979 [JP] Japan .................................. 54-111537

[51] Int. Cl.$^3$ ............................................. G02B 7/10
[52] U.S. Cl. ...................................... 350/429; 350/255
[58] Field of Search ................................ 350/429, 255

[56] References Cited

U.S. PATENT DOCUMENTS

| | | | |
|---|---|---|---|
| 3,330,615 | 7/1967 | Price | 350/429 |
| 3,506,338 | 4/1970 | Holderbaum | 350/44 |
| 3,858,225 | 12/1974 | Hasegawa et al. | 354/46 |
| 4,045,128 | 8/1977 | Momiyama | 350/255 |

Primary Examiner—John K. Corbin
Assistant Examiner—Rebecca D. Gass
Attorney, Agent, or Firm—Toren, McGeady and Stanger

[57] ABSTRACT

An operating mechanism for a zoom lens assembly is constructed with an integrally molded actuating sleeve rotatably fitted on the exterior surface of a tubular body of the assembly and held against axial movement, with a zoom lens cell being slideably fitted to the inner diameter of the tubular body. A camming connection is provided between the sleeve and the cell through a longitudinally elongated slot formed in the tube. The camming connection is formed from an inwardly directed helical cam protuberance having a rectangular cross-sectional configuration molded integrally with the sleeve, a slider freely fitted in the slot affixed to the cell, a cam follower in the form of a detent roller radially outwardly extending from the slider, a reaction roller axially movably mounted in a keyway in the slider, and a spring urging the detent and the reaction rollers to engage the cam protuberance at opposite radial shoulders thereof with a clamping effect.

11 Claims, 16 Drawing Figures

MECHANICAL MOUNTING SYSTEM FOR A ZOOM LENS ASSEMBLY

The present invention relates generally to optical lens devices particularly suitable for cameras and more specifically to a mechanical mounting system for a zoom lens objective. More specifically, the invention is directed to an improved zooming mechanism for such a lens assembly.

It has been widely known to provide in lens assemblies means for axial adjustment of the components of an optical lens system in an interchangeable objective in order to enable focusing and zooming operation to be effected.

For zooming purposes, two components denominated the variator and the compensator are axially moved in differential relationship in order to vary the focal length of the entire system while a fixed focal plane is simultaneously maintained throughout the entire range of the focal length. The actuating mechanism for effecting the relative movements involved in the zooming operation has been designed to include a cam tube which is movably fitted on the interior or exterior surface of a barrel in order to house an interchangeable objective, means of forming helical cam slots in the tube extending about the optical axis of the assembly, means operatively forming a longitudinal slot in the barrel, lens cells for holding the movable components of the system slideably fitted to the inner diameter of the tube or barrel and cam follower pins radially outwardly extending from the lens cells through the longitudinal slot into the respective cam slots. Upon axial movement or rotation of an operating ring of the cam tube, the various lens cells are axially displaced in order to effect a focusing operation or to effect change in the magnification of the object and image shift compensation.

In conventional interchangeable lenses, the design of the cam tube, which has formed therein helical cam grooves or slots, exerts an important influence on many aspects of the lens assembly including the precision with which zooming control may be effected and the capability to manufacture the lenses at low cost utilizing mass production techniques. It has been found that conventional actuating mechanisms for zoom objectives have not been amenable to achievement of relatively low unit cost production and high precision shaping techniques inasmuch as it is difficult to machine with a high degree of accuracy internal cam grooves or cam slots directly through the walls of the tube elements. A sufficiently high degree of accuracy is difficult to maintain and the higher the accuracy the greater the increases in the production costs.

Additionally, as the slope of the shape of the cam is increased, the angle of relative rotation of the operating ring of the assembly may be decreased in order to effect an equivalent amount of axial movement of the zoom lens members with the result that it becomes possible to design interchangeable objectives while limiting their physical length to a minimum. Therefore there may be obtained a compact and somewhat lighter weight interchangeable objective. However, this in turn will require a decrease in the physical strength of the cam tube.

It has therefore been common practice in the prior art to form the cam with a shape which is necessarily moderately steep when the pitch angle of the helix of the cam slot or groove is limited to a prescribed small value and the axial length of the cam tube is accordingly extended. This in turn requires an increase in the angle of rotation of the operating ring relative to the tubular body of the lens assembly. Thus, this raises the complication that the dimensions of the zoom lens assembly will be increased lengthwise thereof and the assembly becomes inconvenient to handle and difficult to carry.

A further disadvantage of conventional zoom mechanisms is that, since the cam follower is in the form of a bearing or roller on a shaft radially extending from the lens cell and is positioned to contact either one of the edges of the camming slot, when an impact force or shock is received at the front of the interchangeable lens assembly, or when the assembly is positioned in a vertical attitude for a length of time, the camming surface will be caused to deform in portions of the bearing or roller. If this occurs, later zooming operation will deteriorate and an unpleasant impression will be received by an operator. The accuracy of the axial movement which is to be effected is also reduced.

The problems arising from use of the aforementioned cam tube in a zooming mechanism have been approached by utilizing synthetic resin materials or the like in molding the cam tube. An example of a technique for producing a camming cylinder by a mold casting process is disclosed in U.S. Pat. No. 3,506,338 (West German Pat. No. 1 272 702). However, with regard to control of the zooming movements of the two lens components of such as assembly, this prior art only concerns itself with an approach wherein one component is urged against a curvilinear shoulder of the camming cylinder. Since the aforementioned prior art employs an arrangement wherein lens mounts are arranged to repel each other by springs mounted on rods in order to maintain a pin in contact with a curvilinear shoulder of the mechanism throughout the entire range of movement of the lens components, the resulting zooming mechanism will require an increased number of constituent parts. This in turn involves increase in the number of shaping and assembly procedures and thus low cost unit production techniques are not enhanced.

The present invention is intended to provide a mechanical mounting system for a zoom objective which will enable a reduction in the number of constituent parts of the lens assembly and which will simplify the assembly procedures thereof while nevertheless preserving good optical performance.

A second aim of the invention is to provide a zooming mechanism having a construction wherein the cam member controlling movement of the zoom lens components and the actuating member therefor may be cast or molded as a unit whereby inexpensive zoom objective assemblies may be commercially provided.

A third aim of the invention is the provision of a new form of cam coupling which assures protection of the camming surface from the formation of concave or convex minute deformations and scratches when the lens assembly within which it is mounted is subjected to external shock particularly in the direction from the side of the object whereby zooming operation may therefore always be performed with a generally desirable feel or impression and wherein the accuracy of zoom control may be maintained at a high level.

A fourth aim of the invention is the provision of an inexpensive lens assembly having focusing capacity to which the principles of zoom mechanisms suited for accomplishing the aforementioned achievements may be applied.

Furthermore, the invention provides a process for manufacturing a cylindrical tubular member with inwardly directed cam protuberances formed on portions thereof, the cylindrical tubular member also serving as an actuating member of the zoom objective assembly and contributing to accomplishment of the aforementioned goals.

SUMMARY OF THE INVENTION

Briefly, the present invention may be described as a zoom lens assembly comprising first and second movable lens means operative to effect zooming operation, first and second lens holding means operatively supporting said first and second movable lens means, a cylindrical member operative to enable said first and second lens holding means to move in the axial direction of said lens assembly, focusing means rotatable about the optical axis of said lens assembly for moving the first and second lens means to effect focusing thereof, a rotatable cam member having an inner peripheral surface and a cam portion thereon for controlling axial movement of the movable lens means, the cam portion being structured in the form of an inwardly projected portion extending from said inner peripheral surface of said cam member, said projected portion defining a camming surface formed on one side thereof in the axial direction of the lens assembly to control the degree of axial movement of the movable lens means and cam follower means responsive to rotation of the cam member for causing the first and second lens holding means to follow said camming surface, the cam follower means having restraining means for allowing the first and second lens holding means to move linearly in the axial direction of the lens assembly while being restrained from rotation as the cam member rotates about the optical axis.

The invention is particularly directed to formation of the cam portion integrally with the cam member so as to define said projected portion with a noncamming side formed on the side of the projected portion opposite the cam surface. The cam follower means include a plurality of follower elements arranged opposite each other with respect to the projected portion, said follower elements including a first follower element urged always into contact with the camming surface and a second follower element bearing on said noncamming side of the projected portion in order to absorb impulse forces imparted to the lens assembly from exteriorly thereof.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF PREFERRED EMBODIMENTS

Figure 1:
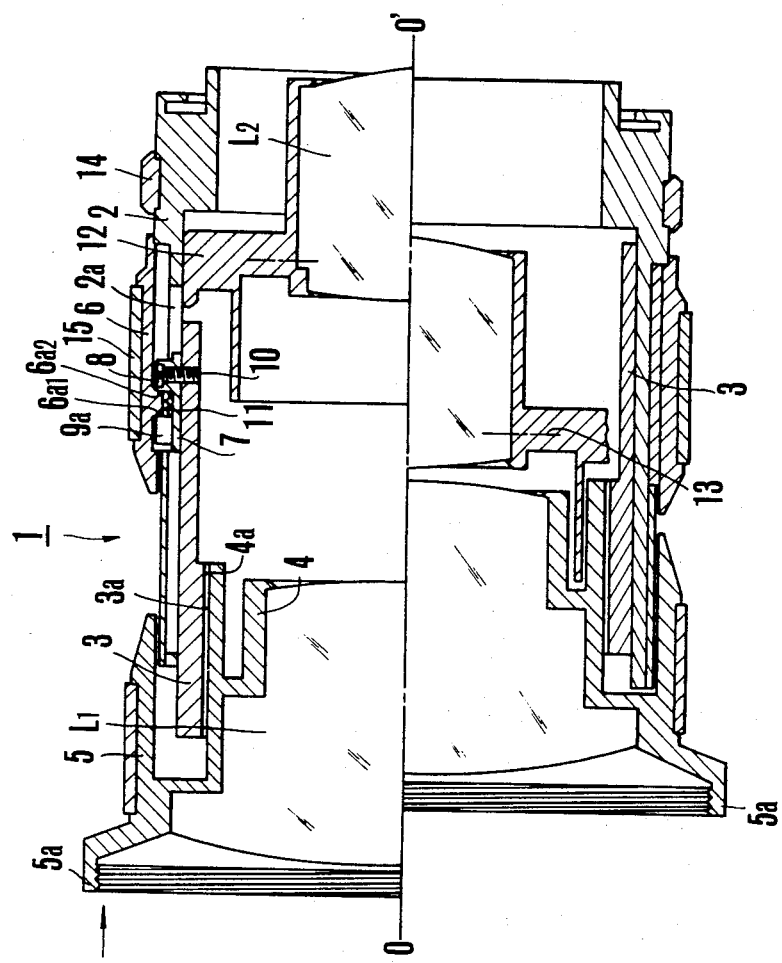
FIG. 1 is an axial sectional view of a zoom objective assembly embodying the present invention and comprising an optical axis O-O' shown with the upper part thereof above the axis O-O' at a wide angle setting and with the lower part at a telephoto setting.
Figure 2:
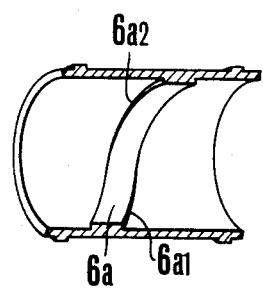
FIG. 2 is a perspective view of a cylindrical tubular member of the zoom lens operating mechanism of the invention formed with an integral cam protuberance serving as the zoom actuator of the assembly.
Figure 3:
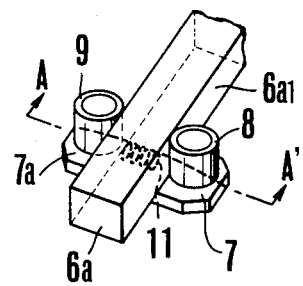
FIG. 3 is a perspective view of a cam coupling member for the zoom lens cell in the zoom objective assembly of FIG. 1.
Figure 4:
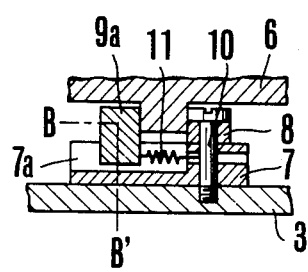
FIG. 4 is a sectional view taken along the line A—A' of FIG. 3.
Figure 5:
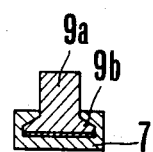
FIG. 5 is a sectional view taken along the line B—B' of FIG. 4.
Figures 6, 7:
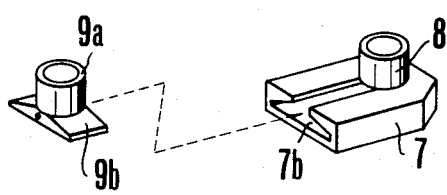
FIGS. 6 and 7 are perspective views showing, respectively, individual parts of the cam follower.

Referring now to the drawings wherein similar parts are identified by like reference numerals throughout the various figures thereof, a first embodiment of the present invention is depicted in FIGS. 1-7 as comprising a zoom lens assembly having an optical axis O—O' with a cylindrical tubular body 2 being formed with an axially elongated linear guide slot 2a, as particularly shown in FIG. 1, with the cylindrical tubular member 2 being provided with a mount member (not shown) at the rear end thereof whereby the lens assembly 1 depicted in FIG. 1 may be attached to the body of a camera (not shown).

The lens assembly includes a second cylindrical tubular member 3 adapted to accommodate a holder frame 4 of a first movable lens group L1 and fitted in the inner diameter of the cylindrical tubular member 2. A focusing control ring 5 is provided for actuating the aforementioned first movable lens group L1 along the optical axis O-O' forwardly or rearwardly thereof in order to effect focusing operation. The focusing ring 5 includes suitable fasteners (not shown) such as screws or the like in order to attach the ring 5 with the aforementioned lens cell. A threaded portion 4a formed in the outer peripheral surface of the lens cell 4 meshes with a threaded portion 3a formed in the inner peripheral surface of the aforementioned second tubular member 3 so that when the focusing control ring 5 is rotated about the optical axis, the front lens group L1 will be axially moved in order to effect focusing.

A camming cylinder member 6 is fitted on the outer diameter of the tubular body 2, with the cylinder member 6 being counterbored at both ends thereof and arranged to be rotatable about the optical axis in sliding engagement with the outer periphery of the tubular body 2 while being constrained from axial movement. The camming cylinder 6 is formed with a protuberance 6a having a rectangular cross section and formed on the inner surface of the cylindrical member 6. The protuberance 6a has a first radial shoulder finished to define a camming surface 6a1 adapted to cooperate with a cam follower, to be more fully described hereinafter, in order to effect axial movement of the first movable lens group L1 along the optical axis O-O' of the lens assembly.

It should be noted that the cross-sectional configuration of the protuberance 6a need not necessarily be confined to a rectangular shape and may, for example, be of a trapezoidal or triangular configuration.

A cam follower is arranged between the camming cylinder 6 and the second tubular member 3. The cam follower is shown in greater detail in FIGS. 3-7 and is formed to comprise a key member 7 fitted in the guide slot 2a, a detent 8 and a stop member 9, with the detent 8 being shaped in the form of a roller.

The key member 7 and the roller 8 are fixed to the second tubular member 3 by a screw fastener 10, with the roller 8 being rotatable about the screw 10. The key member 7 extends across the camming protuberances 6a in a direction axially of the lens assembly with the key member 7 being located for axial movement within the inner guide slot 2a.

A stop member 9 formed on an extended end portion 7a of the key member 7 comprises a pin portion 9a and a boss portion 9b, with the boss portion 9b being configured to be fitted in a keyway 7b of the key member 7. The pin portion 9a is pulled by a spring 11 which is positioned in a space within a keyway 7b so that the roller 8 will be pressed against the camming surface 6a1 of the protuberance 6a.

As shown in FIG. 1, the assembly of the invention includes a second lens holding frame 12 for supporting a second movable lens group L2 fitted in the tubular body 2. The second movable lens group L2 must be movably adjusted in position within the lens assembly in a manner similar to that previously described with reference to the first movable lens group L1. Thus, a camming surface of a second protuberance (not shown) having a rectangular cross section provided on the inner surface of the aforementioned camming cylinder member 6, and a cam follower similar in construction to that shown in FIGS. 3-7, are assumed to be provided for this purpose. Since their structure and operation is similar to that previously described, a detailed illustration and explanation thereof are omitted.

The lens assembly of FIG. 1 also includes a diaphragm device 13 which is carried on the second lens cell. A diaphragm value setting ring 14 is fitted on the tubular body 2 and is linked with the diaphragm device in order to enable manual adjustment of the size of the aperture opening of the lens assembly to a desired value. The diaphragm value setting ring 14 and the diaphragm device 13 may be of known construction and therefore a detailed explanation thereof is not provided.

The camming cylinder member 6, in accordance with the present invention, may be made of synthetic resin material, for example polycarbonate and it may be formed by utilizing mold casting techniques.

In the embodiment of the zoom lens assembly in accordance with the present invention depicted in FIGS. 1-7, when the focusing control ring 5 is rotated, the first lens group L1 is moved axially forwardly from the second tubular member 3 to effect focusing.

Subsequently, for the purposes of effecting zooming operation, the zoom control ring 15 affixed to the camming cylindrical member 6a is rotated. Since the key member 7 of the first cam follower engages in the linear guide slot 2a of the tubular body 2, and since the roller 8 and the pin 9a engage the protuberant portion 6 in a sandwich-like manner, rotation of the camming cylinder 6 will cause the second cylindrical member 3 to be moved axially by a distance depending upon the degree of displacement of the camming surface 6a1 with respect to the optical axis O-O'.

By rotation of the camming cylinder 6, axial movement is imparted additionally to the lens holder frame of the second lens group L2, depending upon the degree of displacement of the second camming surface (not shown) with respect to the optical axis O-O'.

Upon rotation of the zoom actuator ring 15 in order to operate the zoom lens assembly of the invention, the first and second movable lens groups L1 and L2 will have axial movements imparted thereto which are controlled in accordance with the configuration and displacement of the camming surfaces of the respective cam portions. By continuously moving the first and second movable lens groups L1 and L2 while holding a relative corresponding relationship based upon the degree of displacement of the respective camming surfaces, it is possible to effect a zooming operation wherein magnification of the object is varied while a constant focal plane is maintained.

In the cam follower 7, 8, 9, 11 of the zoom lens assembly of the embodiment thus described, the roller 8 is maintained to be always pressed against the camming surface 6a1 and the key member 7 is fitted in the linear guide slot 2a without looseness so that backlash is avoided when the zoom actuator ring is rotated in one direction or the other. Thus, zooming accuracy may be maintained at a relatively high level.

One of the more significant features of the present invention involves the fact that the camming cylinder 6 which operates for zoom control is provided with the protuberance formed in a portion of the inner peripheral surface thereof thereby giving rise to the advantage that the physical strength of the camming cylinder is increased and the size of the entire lens may be shortened. Furthermore, the thickness of the wall may be relatively thinner thereby achieving further advantages from the point of view of compactness of the zoom lens assembly.

Furthermore, the camming cylinder is amenable to previously described manufacturing techniques and thus efficient mass production may be utilized thereby contributing to lowering of the manufacturing costs for the zoom lens assembly.

A further feature of the invention resides in the fact that the deleterious influence of physical forces which may be imparted to the lens assembly from the front end thereof, as previously mentioned in discussing the prior art, may now be eliminated.

Thus, even when an external force is applied to the front of the assembly in a direction indicated by the arrow in FIG. 1 against the edge 5a of the focusing control ring 5, such an external force will be applied through the control ring 5 and the second cylindrical member 3 to the pin 9a and the pin 9a will be pressed against the surface 6a2 of the cam protuberance 6a which is opposite to the camming surface 6a1. As this external force is increased in magnitude, it may occur that the surface 6a2 will be damaged or deformed for example by the creation of concave or recessed portions therein. However, even if this should occur, the camming surface 6a1 will be protected from damage due to external forces because the roller 8 will be driven out of contact with the camming surface 6a1 by the external shock which is applied thereby eliminating the possibility of damage against the camming surface which controls zooming operation. This will occur since with movement of the second cylindrical member 3, the key member 7 will be driven away from the camming surface 6a1 by a force applied in the direction of the arrow shown in FIG. 1.

With conventional cam couplings where the camming cylinder is machined to form a cam slot or where either of the ends of a camming cylinder is configured to provide a camming surface, a force from externally of the lens assembly applied directly to the camming edge or surface will effect a deformation or damage of the camming surface. For this reason, an operator using a conventional lens assembly will be caused to experience an unpleasant impression or feel due to the formation of such a deformed portion and thus zooming operation will not be capable of performance with as much control or accuracy. It will be seen that, with the present invention, problems such as those described above have been essentially overcome or eliminated.

In a second embodiment of the present invention depicted in FIGS. 8–12 further advantages are derived with respect to the structure of the cam follower. In the application of excessive shock or impact forces to the lens assembly from the front thereof, although no damage is caused to the camming surface since the force is absorbed by the stop member 9, it is conceivable that dents or indentations will be created in the noncamming surface 6a2 opposite thereto and a raised portion may be developed surrounding a dent. Since the creation of raised portions which will be engaged by the stop member during zooming operation will tend to give an unpleasant feel to an operator, it is desirable if the likelihood thereof could be eliminated. Furthermore, as the magnitude of a shock increases, the shock force is transmitted through the focusing ring 5 and the second cylindrical member 3 to the roller 8 with the roller 8 being pushed rearwardly of the lens assembly. This will cause the spring 11 to be extended with the result that the recovering force of the spring 11 could be diminished. In the second embodiment depicted in FIGS. 8–12 improvements with regard to the foregoing are provided.

In the embodiment of FIGS. 8–12, a first cylindrical member 21 is formed with linear guide slots 21a1 and 21a2. A second cylindrical member 22 holds a cell 23 of a first movable lens group L1, threaded portions 22a and 23a are provided between the member 22 and the cell 23, a focusing ring 24 is provided and a camming cylinder 25 is fitted on the outer diameter of the first cylindrical member 21 and is coupled together with a zoom actuator or ring 38. The assembly includes a cell 26 of a second movable lens group L2, a diaphragm device 27, a diaphragm presetting ring 28, with the arrangement of these parts being similar to that described in connection with the first embodiment of the invention. A key member 28 is fitted in the linear guide slot 21a1 with the key member 28 carrying a roller 30 which is rotatably supported by a screw 29.

The key member 28 extends toward the front end of the lens and carries at one end thereof a second roller 31 which is rotatably mounted by a screw 32 at a position opposite a cam portion 25a of the camming cylinder 25.

A spring 33 is arranged in the linear guide slot 21a1 and a linear slot 22a1 formed in the second cylindrical member 22 and it is connected at one end thereof to the front end 21b of the first cylindrical member 21 and at the opposite end to the front end of the key member 28. The key member 28, the rollers 30 and 31 and like components constitute a cam follower which is urged by the spring 33 toward the forward end of the lens assembly. Since the cam follower is fixed by the screw 29 to the second cylindrical member 22, the member 22 and the first movable lens group L1 will be urged toward the front of the lens assembly. For this reason, the roller 30 is always maintained pressed against the camming surface 25a1.

Figure 8:
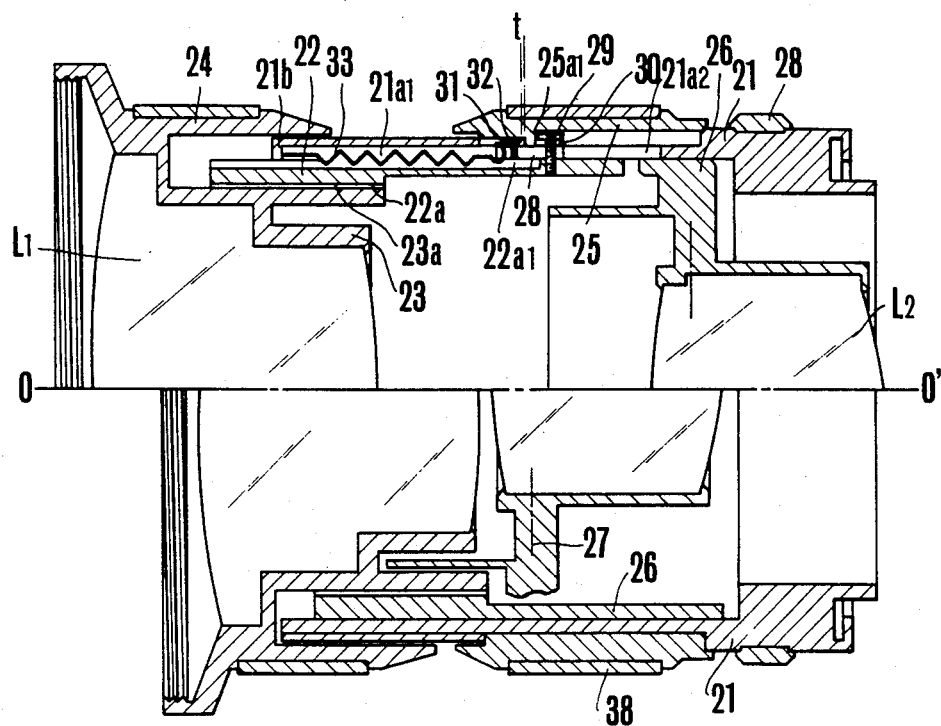
FIG. 8 is an axial sectional view of a second embodiment of the invention showing a lens assembly having an optical axis O—O' with the upper part of the lens assembly shown set at the wide angle position and with the lower part thereof shown set in the telephoto position.
Figure 9:
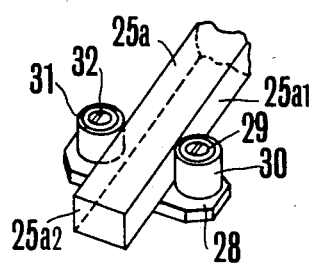
FIG. 9 is a perspective view of the camming coupling for the zoom objective of the assembly of FIG. 8.
Figure 10:
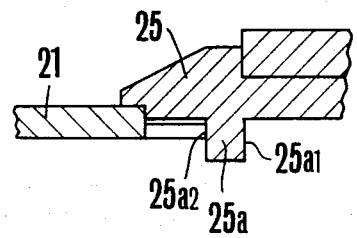
FIG. 10 is a fragmentary sectional view of the zoom actuator ring and cam portion of the assembly shown in FIG. 8.
Figure 12:
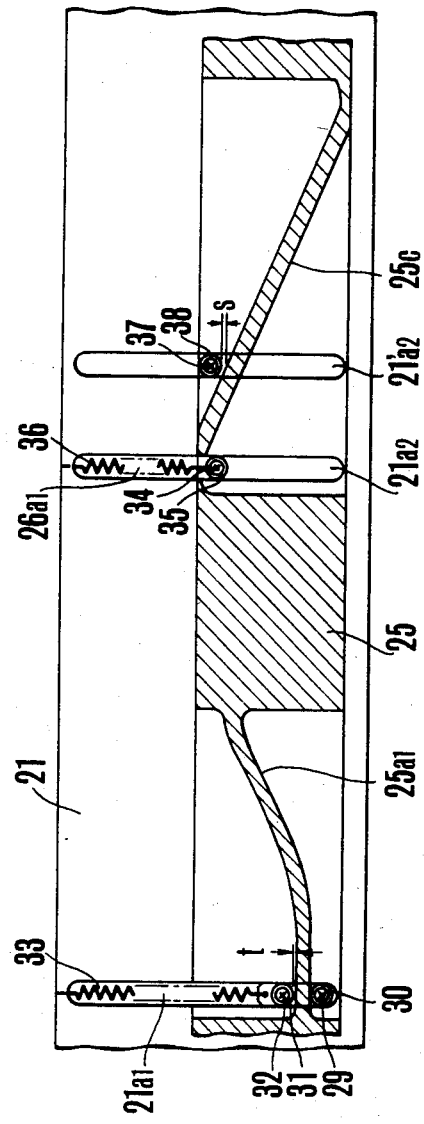
FIG. 12 is a developed representation of the zoom actuator ring and the cylindrical tubular member of the embodiment shown in FIG. 11.

The arrangement of the rollers 30 and 31 is such that they are positioned on opposite sides of the cam portion 25a and when the cam follower is pulled forward by the spring 33 as shown in FIGS. 8 and 12, there is created a small gap t.

Figure 11:
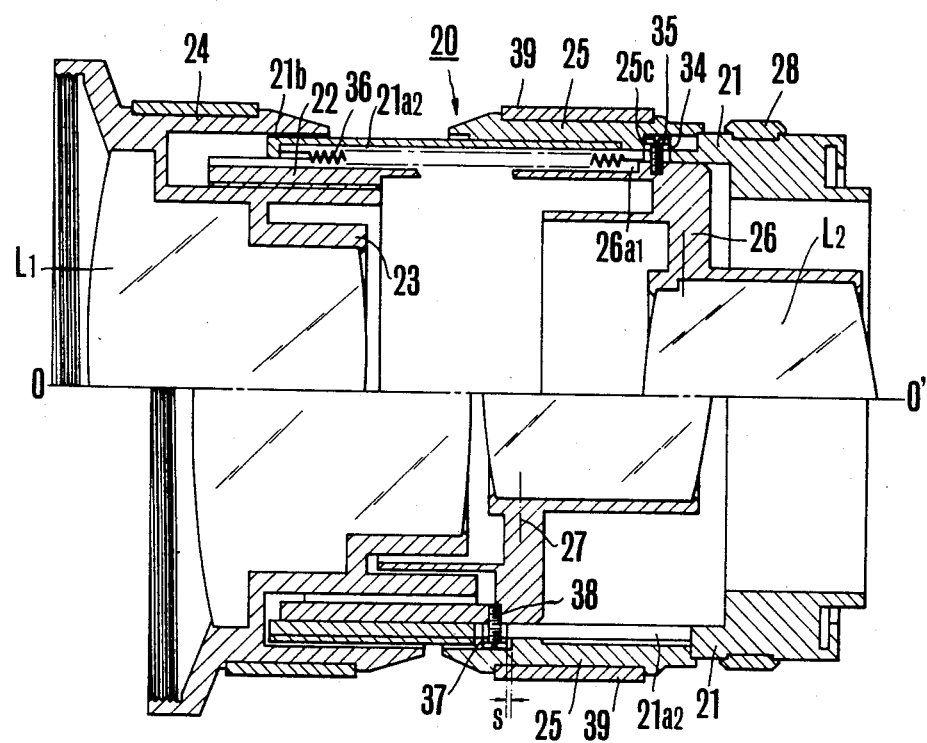
FIG. 11 is an axial sectional view showing a third embodiment of the present invention.

FIG. 11 depicts a control mechanism for the second movable lens group L2. A lens cell 26 for the second movable lens group L2 is fitted in the first cylindrical member 21. A roller 34 is rotatably mounted on the lens cell 26 by a screw 35 with the roller 34 abutting against a camming surface 25c formed in the camming cylinder 36.

A spring 36 is arranged in linear slots 21a2 and 26a1 provided in the first cylindrical member 21 and lens cell 26, respectively, as shown in FIG. 11 and is connected at one end thereof to the front end 21b of the first cylindrical member 21 and at its opposite end to the screw 35 so that the roller 34 and lens cell 26 are pulled forwardly of the lens assembly.

Furthermore, the lens 26 of the second lens group L2 carries a second roller 37 rotatably mounted by a screw 38, with the roller 37 being engaged in the linear guide slot 21a2 provided in the first cylindrical member 21. The arrangement of the first and second rollers 34 and 37 of the lens cell 26 is such that when the lens cell 26 is pulled by the spring 36 there is created a gap from the edge of the cam portion.

Focusing and zooming operation of the zoom lens assembly of FIGS. 8–12 are carried out in manners similar to those described in connection with the first embodiment. By rotation of the focusing ring 24, only the first movable lens group L1 will be axially moved to effect focusing. By rotation of the zoom actuator 39, which is coupled together with the camming cylinder 25, the first lens group L1 and the second lens group L2 will be axially moved distances depending upon the amounts of displacements of the camming surfaces respectively determined by engagement of the rollers 30 and 34 pressed against the camming surfaces 25a1 and 25c and the cam follwer member engaged within the linear guide slots 21a1 and 21a2. Therefore, the amounts of displacement of the camming surfaces 25a1 and 25c are required to be set in relative corresponding positional relationship such that the magnification of an object may be varied while the focal plane is maintained at a constant position.

Since in this embodiment, the springs 33 and 36 urge the rollers 30 and 34 to be always pressed against the camming surfaces 25a1 and 25c and the first lens cell 23 and the second lens cell 26 always toward the object side, there is no possibility of backlash when change of direction of the axial movement occurs and therefore there will be no lowering of optical accuracy. Also, application of physical external forces to the front of the lens assembly will be prevented from forming a concave indentation in the camming surface or from damaging parts of the assembly as the rollers 31 and 37 arranged on the noncamming surface sides of the cam portion play a role as stopper members.

The present invention has been described in connection with embodiments thereof wherein the lens optical system is of the two-component type having two movable lens components indicated as L1 and L2. However, it should be understood that the invention is not confined to utilization with such a type of lens device. It is of course possible to apply the principles of the invention to devices having a greater number of components such as a 3-component or 4-component zoom objective optical system with the relay lens group arranged in the aforementioned cylindrical member 2 or 21.

Cam portions 6a and 25a shown in connection with the embodiments previously described in FIGS. 1–12 are of the inwardly projected type and the axial length of the projected portion is comparatively thin. Therefore, when a large external force is applied, the external force is apt to cause creation of a concave portion in the camming surfaces 6a1, 25a1. Furthermore even in the mold casting, when the axial length of the cam portion is short, it is difficult to limit the dimensions of the camming surface to the required tolerances.

Figure 13:
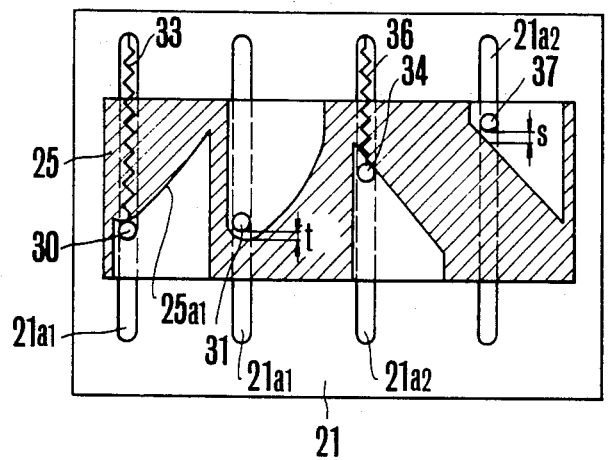
FIGS. 13 and 14 are, respectively, developed representations of another embodiment of the zoom actuator ring and cylindrical tubular member in accordance with the invention.
Figure 14:
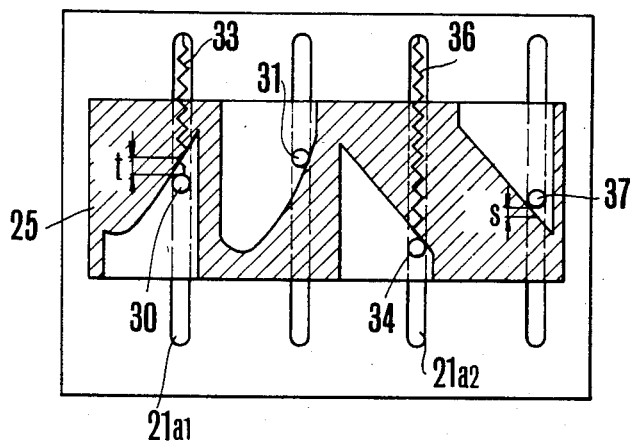

FIGS. 13 and 14 show examples of modifications of the cam portion with the longitudinal length increased to solve this problem.

FIG. 13 is a developed view of the cam portion shown when the zoom actuator is turned to the telephoto position. FIG. 14 is a dveloped view similar to FIG. 13 showing the cam portions when the lens assembly is turned to the wide angle position.

It should be noted that in the embodiments of FIGS. 1–14, the camming cylinder 6, 25 and the zoom actuator 15, 38 may be manufactured separately from each other but it is possible by constructing the camming cylinder and the zoom actuator in a mold casting as a single unit to minimize the number of constituent parts and the number of assembly steps required.

Figure 15:
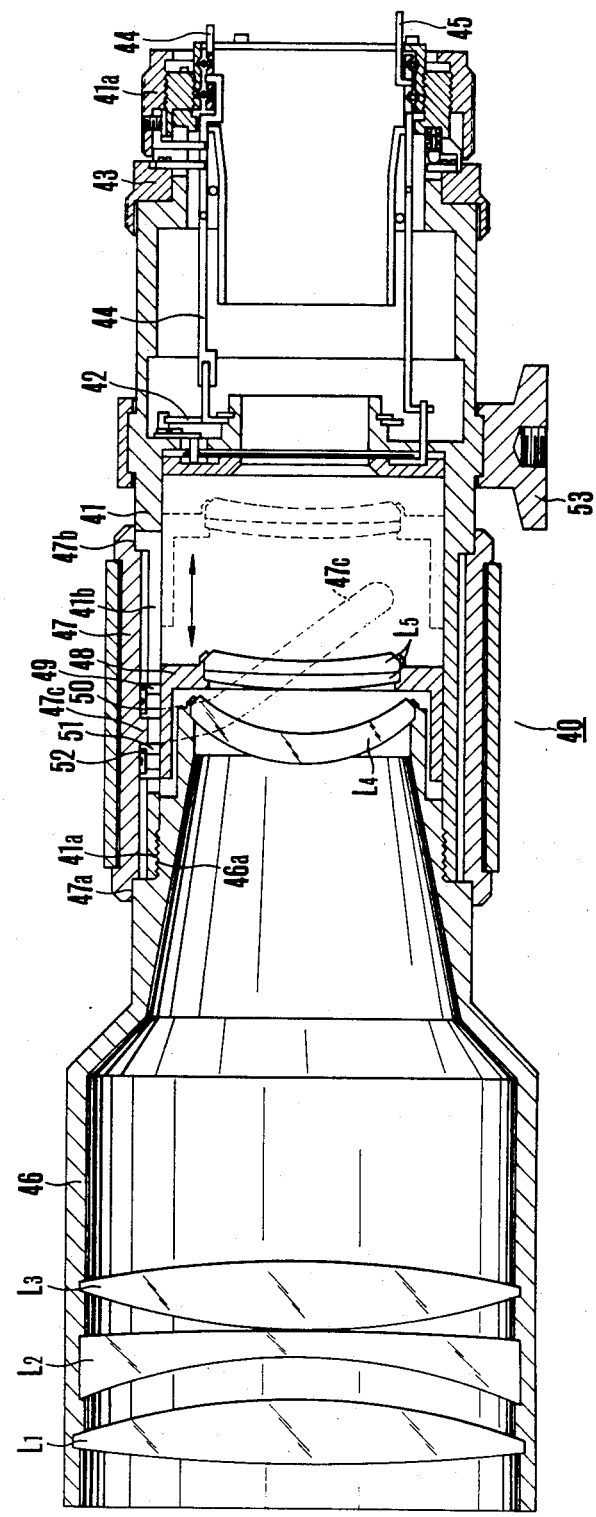
FIG. 15 is an axial sectional view of an objective assembly with the cam coupling of the present invention applied to the focusing mechanism thereof.

FIG. 15 depicts an example of the application of the cam coupling of the invention to a focusing control mechanism. The conventional focusing control mechanism, as has been described in connection with the embodiments of the invention, comprises a helicoid coupling between the lens cell and the tubular body in the interior of the lens assembly and adapted for reference to a camera body.

This may give rise to problems in that the expense in time necessary to machine the helicoid coupling will adversely influence the production costs. Furthermore, coupling precision of the helicoid members may have an adverse influence on focusing control. In accordance with the invention, for example, when manufacturing the focusing ring of a synthetic resin material by mold casting techniques, it is possible to simultaneously form the cam portion for axial movement of the lens and therefore to obtain a lens assembly of low cost.

In an example of this application depicted in FIG. 15, lens assembly 40 is shown representing an example of this type of application. The lens assembly 40 in FIG. 15 includes a cylindrical member 41 equipped at its rear end with a mount portion 41c, the cylindrical member 41 containing a diaphragm device 42 of known construction. A diaphragm presetting ring 43 cooperates with the diaphragm device 42 through a linkage 44 which also serves to transmit aperture value information between the diaphragm 42 and a camera mechanism (not shown).

The aperture value information transmitting mechanism is known in the art as disclosed, for example, in U.S. Pat. No. 3,858,225. Furthermore, this transmitting mechanism is also applicable to the zoom lens assembly of the previously described first and second embodiments of the present invention.

At the front end of the cylindrical member 41 there is affixed a lens cell 46 containing a lens group comprising the lenses L1, L2, L3, L4 at predetermined positions relative to the focal plane of the camera. A focusing actuator ring 47 is fitted on the outer diameter of the cylindrical member 41 and the focus actuator ring 47 has counterbored portions 47a and 47b in the end portions thereof. The counterbored portions 47a and 47b are fitted in an annular recessed portion of the cylindrical member 41 so that it is restrained from axial movement but is rotatable about the optical axis of the lens assembly.

The lens cell 46 and the cylindrical member 41 are connected in fixed relationship to each other by screw threads 46a and 41a. An axially movable lens cell 48 contains a lens L5 movable for focusing within the cylindrical member 41. The focusing ring 47 is provided with a cam portion for moving the movable lens L5 through a certain distance depending upon the amount of rotation with the cam portion having a protuberance 47c extending inwardly from the inner surface of the focusing ring 47 and formed by mold casting techniques, the protuberance 47c having a camming surface provided at a side thereof facing the axial direction.

The movable lens cell 48 is provided with cam follower means responsive to rotation of the focusing ring in order to cause the lens cell 48 to follow the cam protuberance 47c depending upon the amount of displacement thereof. This cam follower means is practically similar in construction to that described in connection with FIG. 3. That is, there is provided a roller 49 rotatably screw-fastened to the outer periphery of the movable lens cell 48 by an eccentric screw 50. This roller 49 and the screw 50 are fitted in a linear guide slot 41b parallel to the optical axis and provided in the cylindrical member 41 so as to abut on the camming surface of the protuberance 47c.

A second roller 51 and an eccentric screw 52 are held in the movable lens cell 48 on the opposite side of the protuberance 47c to the roller 49 and are fitted in the linear guide slot 41b. A bushing 53 is provided for use in mounting the lens assembly 40 on a tripod (not shown) or the like.

In a lens assembly of the construction described above, when the focusing ring 47 is rotated about the optical axis, the movable lens cell 48 is moved forwardly in relation to the linear guide slot 41b and the camming surface, depending upon the amount of displacement of the camming surface with respect to the optical axis, thus effecting focusing operation in accordance with differing object distances.

In accordance with this example of the invention, it is possible to construct the cylindrical portion and the cam portion of the focusing ring 47 integrally with each other by simultaneous mold casting thereof. Therefore, time consuming machining procedures are avoided and an inexpensive lens assembly may be obtained. Furthermore, the focusing actuator ring may be mass produced utilizing synthetic resin material to great advantage.

The camming cylinder 6, 25 and the focusing ring 47 may be constructed from a hollow member with camlike projected portions 6a, 25a, 47c fastened to the inner surface of such a hollow member by screws, adhesive or other suitable means. However, the unitary construction which may be formed by injection molding to provide an integral unit is advantageous and provides greater benefits particularly with regard to mass production techniques.

Figure 16:
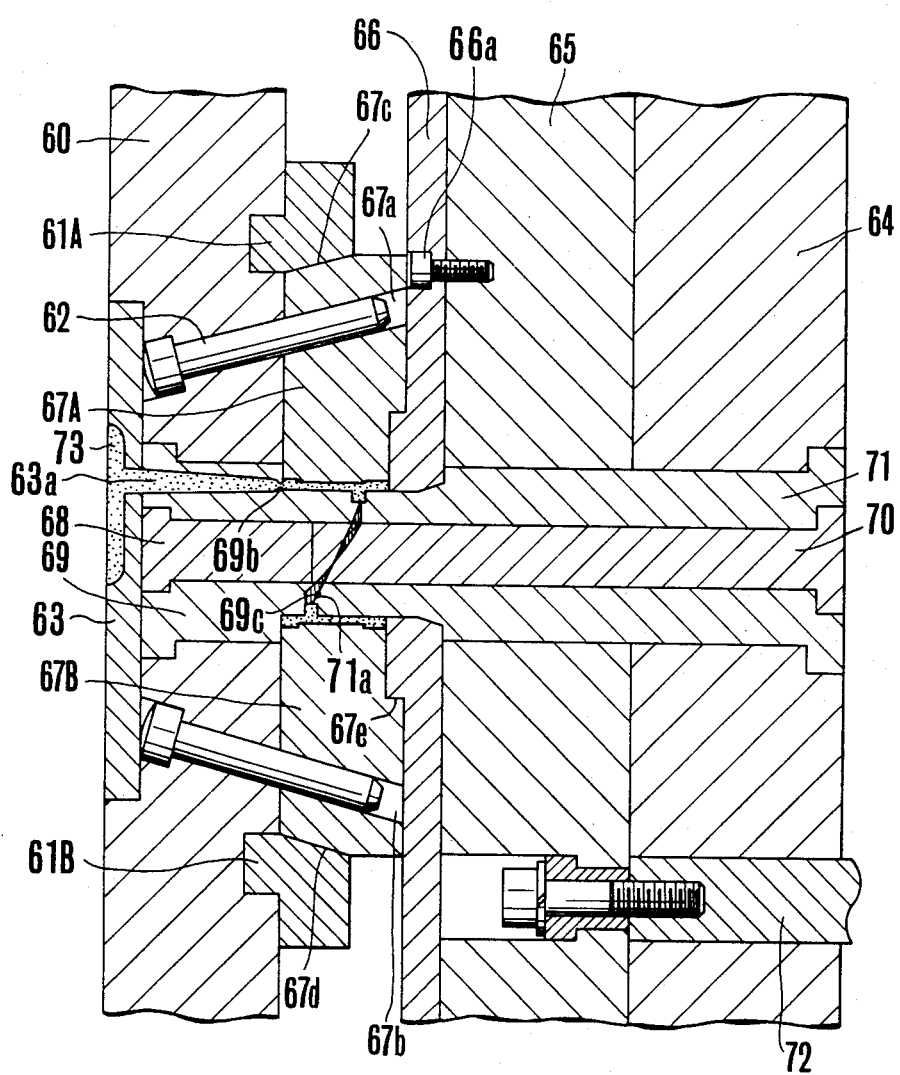
FIG. 16 is a sectional view of an example of mold casting apparatus which may be utilized for manufacturing the camming cylinders and focusing actuator members adaptable for use in the zoom objective assemblies or in lens mounting systems in accordance with the present invention wherein synthetic resin materials are utilized.

FIG. 16 is a cross-sectional view of the main parts of a metallic mold which may be utilized for injection molding of the camming cylinder. In FIG. 16, the mold apparatus is shown as comprising a fixed template 60, a locking block 61A affixed to the template 60, an inclination pin 62 affixed to the template at an angle of inclination and a runner plate 63 affixed to the fixed template having an air space 63a forming the runner through which molten resin may flow. The apparatus includes a movable template 64 and a first stripper plate 65. A second stripper plate 66 is affixed to the first stripper plate 65 by a screw 66a. Slide cores 67A, 67B are formed with holes 67a, 67b through which the inclination pins 62 extend and which have upper end surfaces in contact with the locking block 61A at an inclination 67c, 67d.

The slide core 67A, 67B is immobilized at both sides in the axial direction by the fixed template 60 and the stripper plate 66, and at the upper portion by locking block 61A. Furthermore, the slide core is regulated in position by a stepped portion 67e.

The fixed side of the mold is provided with a first core 68 and a second core 69. The movable side is provided with a first core 70 and a second core 71. The fixed side second core 69 and the movable side second core 71 have parting faces 69c, 71a at the projected portions 6a, 25a of the camming cylinder 6, 25. Also, the air space 63a of the fixed side second core 69 forms a runner 73 and a gate 69b as an injection entrance for the resin material into the camming cylinder forming portion of the mold.

A return pin 72 is provided for pressing the stripper plate 65.

In the operation of the metal mold of the construction described above, when the movable side template 64 is moved to the left in the axial direction, the slide core 67A while being guided by the inclination pin 62 is brought into abutment on the fixed side template 60 and its position is adjusted by the stepped-down portion 67e in the locking block 61A, 61B.

In this state, the slide core 67A, 67B, the fixed side second core 69 and the movable side second core 71 form an airspace configured to the aforementioned camming cylinder 6, 25. Molten resin is then injected through the air space 63a forming a runner and further conducted therefrom through the gate 69b to fill the airspace forming the camming cylinder 6, 25.

In order to remove the finished molded camming cylinder 6, 25 from the mold apparatus, after the runner 73 has been cooled, it is first pulled from the fixed side second core 69 and runnerplate 63 and at the same time the gate 69b is cut off. Subsequently, the movable side template 64 and the first and second stripper plates 65 and 66 are moved together to the right whereby the fixed side second core 69 is moved away from the inner peripheral surface of the camming cylinder 6, 25.

At the same time, the slide core 67A, 67B is moved along the inclination pins 62A, 62B whereby the slide core 67A, 67B is moved away from the outer peripheral surface of the camming 6, 25. The return pin 72 is then depressed causing the first stripper plate 65 to be moved away from the movable side template 64. At the same time, the second stripper plate 66 pushes the camming cylinder 6, 25 at the end thereof and the movable side second core 71 is slipped from the inner peripheral surface of the camming cylinder 6, 25. The camming cylinder 6, 25 will fall by its own weight from the second stripper plate 66 and thus it may be removed from the mold apparatus.

It will be noted that in the foregoing the present invention has been described in order to provide a cam portion as an inwardly projecting member from the inner peripheral surface of a camming cylinder of the lens assembly. Therefore, the physical strength of the camming cylinder will be increased as compared with a situation where, as is generally accepted in the prior art, a cam slot is machined in a tubular member to form a camming cylinder.

Furthermore, the cam portion of the camming cylinder of the invention also has the advantage that it may serve as a beam of the cylinder.

While specific embodiments of the invention have been shown and described in detail to illustrate the application of the inventive principles, it will be understood that the invention may be embodied otherwise without departing from such principles.

What is claimed is:

1. In a zoom lens assembly defining an optical axis having first and second movable lens means operative to effect zooming operation, first and second lens holding means operatively supporting said first and second movable lens means, a cylindrical member operative to enable said first and second lens holding means to move in the axial direction of said lens assembly, and focusing means rotatable about said optical axis for moving said first and second lens means to effect focusing thereof, the improvement comprising:

a zoom actuator member rotatable about said optical axis and arranged to be accessible from outside of said assembly having a first and second cam portion for controlling axial movement of said first and second movable lens means upon rotation of said zoom actuator member, said first and second cam portions having a camming surface formed on one axial side of a projected portion extending from the inner peripheral surface of said zoom actuator member;

cam follower means responsive to rotation of said zoom actuator member for causing said first and second movable lens means to follow said first and second cam portion, respectively, said cam follower means having a key member fitted in a linear guide slot extending parallel to said optical axis and provided in said cylindrical member, a detent element held in said key member and contacting said camming surface of said cam portion and a stop member affixed to said key member and arranged to bracket said cam portion; and biasing means urging said detent element in an axial direction of said assembly so that said detent element is pressed against said camming surface.

2. A zoom lens assembly defining an optical axis comprising:

first and second movable lens means operative to effect zooming operation;

first and second lens holding means containing said first and second movable lens means;

a first cylindrical member elongated in the axial direction of said lens assembly;

a second cylindrical member arranged between said first cylindrical member and said first lens holding means, said second cylindrical member and said first lens holding means being helicoid-coupled with each other upon forward movement to effect focuing of said lens assembly;

a zoom actuating member fitted on the outer diameter of said first cylindrical member and rotatable about said optical axis, said zoom actuating member having a first and second cam portion in the inner peripheral surface thereof to move said first and second movable lens means during zooming, each of said first and second cam portions extending from the inner peripheral surface of said zoom actuating member to form side surfaces facing in the axial direction of said lens assembly, one of said side surfaces serving as a camming surface;

a first and a second cam follower for causing said first and second movable lens means to follow the camming surface of said first and second cam portion, respectively, said first cam follower and said second cam follower comprising a detent element fitted in a linear guide slot provided in said first cylindrical member and a stop member arranged on a side of said respective can portion opposite to said detent element;

first biasing means urging said respective cam follower toward the forward end of said zoom lens assembly to bring said detent element into abutment with said respective camming surface and to space said stop member apart from said projected portion.

3. A lens assembly for a zoom lens including a zooming operation member and an optical axis comprising:

(a) first and second movable lens means holding a variator lens and a compensator lens, respectively;

(b) a cam member rotated by a rotating action around said optical axis of said zooming operation member and having a first and a second cam portion to control movement of said first and second lens means, respectively, said cam portions comprising projected portions projecting inwardly toward said optical axis and having a cam surface provided at one side of each one of said projected portions to determine the amount of movement of said first and second movable lens means;

(c) a fixed cylinder having a linear guide;

(d) first cam follower means for the first movable lens means, said first cam follower means having a pair of cam follower members so placed as to sandwich said projected portion of said first cam portion, wherein said first cam follower means has its rotation around the optical axis restricted by the linear guide provided at the fixed cylinder for shifting the first movable lens means by rotation of said cam member; and (e) second cam follower means for said second movable lens means, said second cam follower means having a pair of cam follower members so placed as to sandwich said projected portion of said second cam portion, wherein said second cam follower means receives a restriction on its rotation around the optical axis by the linear guide provided at the fixed cylinder for shifting the second movable lens means by rotation of the cam member.

4. An assembly according to claim 3 wherein said cam member and said zooming operation member are formed separately from each other.

5. An assembly according to claim 3 wherein said cam member and said zooming operation member are formed integrally with each other.

6. A lens assembly according to claim 3 wherein said first and second cam follower means are so placed sandwiching said projected portions so as to comprise a cam follower member placed at the cam surface side of said protruding portion biased to abut on the cam surface and at the same time another cam follower member placed at an opposite side of the cam surface receives a force working on the lens assembly from the outside thereof.

7. A focusing mechanism of a lens assembly including a focusing operation member comprising:

(a) movable lens means holding a focusing lens;

(b) a cam member rotated by rotating operation of said focusing operation member around the optical axis of said lens assembly, said cam member having a cam portion to control movement of said movable lens means, wherein said cam portion is formed to have a projected portion projecting toward said optical axis, and a cam surface is provided on said projected portion;

(c) a fixed cylinder having a linear guide; and (d) cam follower means having a pair of cam follower members which are attached to said movable lens means and penetrate through the linear guide of the fixed cylinder and are so placed as to sandwich said projected portion, wherein movements in the direction of the optical axis of said movable lens means are controlled by a rotating operation of the focusing operation member.

8. A mechanism according to claim 7 wherein said cam member is made separately from said focusing operation member.

9. A mechanism according to claim 7 wherein said cam member is made integrally with said focusing operation member.

10. A lens assembly having an optical axis comprising:

first and second lens means;

focusing means for moving said first lens means to effect focusing operation thereof;

a zooming operation member rotatable about said optical axis to effect zooming operation of said lens assembly by axial movement of said first and second lens means;

a first and second cam member on said zooming operation member for driving said first and second lens means, respectively;

each of said first and second cam members having first and second cam surfaces arranged in opposed relationship thereon in the direction of said optical axis;

first cam follower means connected with said first lens means and engaging said first cam member;

second cam follower means connected with said second lens means and engaging said second cam member;

each of said first and second cam follower means comprising a pair of cam follower members engaged, respectively, on said opposed cam surfaces of each of said first and second cam members, respectively;

linear guide means having said first and second cam follower means engaged therein to restrain movement thereof to directions axially along said optical axis; and spring means connected in each of said first and second cam follower means applying a spring force urging said cam follower members into engagement with said opposed cam surfaces, said spring means operating to enable said lens assembly to absorb shock forces without incurring damage.

11. A lens assembly defining an optical axis comprising:

first and second lens holding means having thereon, respectively, first and second movable lens means operative to effect zooming operations;

a rotatable cam member having cam means for controlling axial movement of said first and second movable lens means, said cam means being inwardly projected extending from said cam member and defining camming surface means formed on sides thereof opposed in the axial direction of said lens assembly to control axial movement of said first and second movable lens means; and cam follower means engaging said cam means responsive to rotation of said cam member for causing said first and said second lens holding means to follow said camming surface means, said cam follower means having restraining means for allowing said first and said second lens holding means to move linearly in the axial direction of said lens assembly while being restrained from rotation as said cam member rotates about said optical axis;

said camming surface means comprising a noncamming side and a camming side, said cam follower means including a plurality of follower elements arranged opposite each other with respect to said cam means, said follower elements including a first follower element urged to always contact said camming side and a second follower element located on said noncamming side of said projected portion to absorb impulse forces imparted to said lens assembly from exteriorly thereof;

said first follower element of said cam follower means being a roller rotatably mounted on a key member which is fitted in a linear guide slot extending parallel to said optical axis and formed in a fixed tubular body of said zoom lens assembly, said second follower element being urged by a spring connected between said second follower element and said key member so that said roller is pressed against said camming side.

* * * * *